C. E. LORD.
MOTOR CONTROL SYSTEM.
APPLICATION FILED MAR. 30, 1907.
945,103.
Patented Jan. 4, 1910.
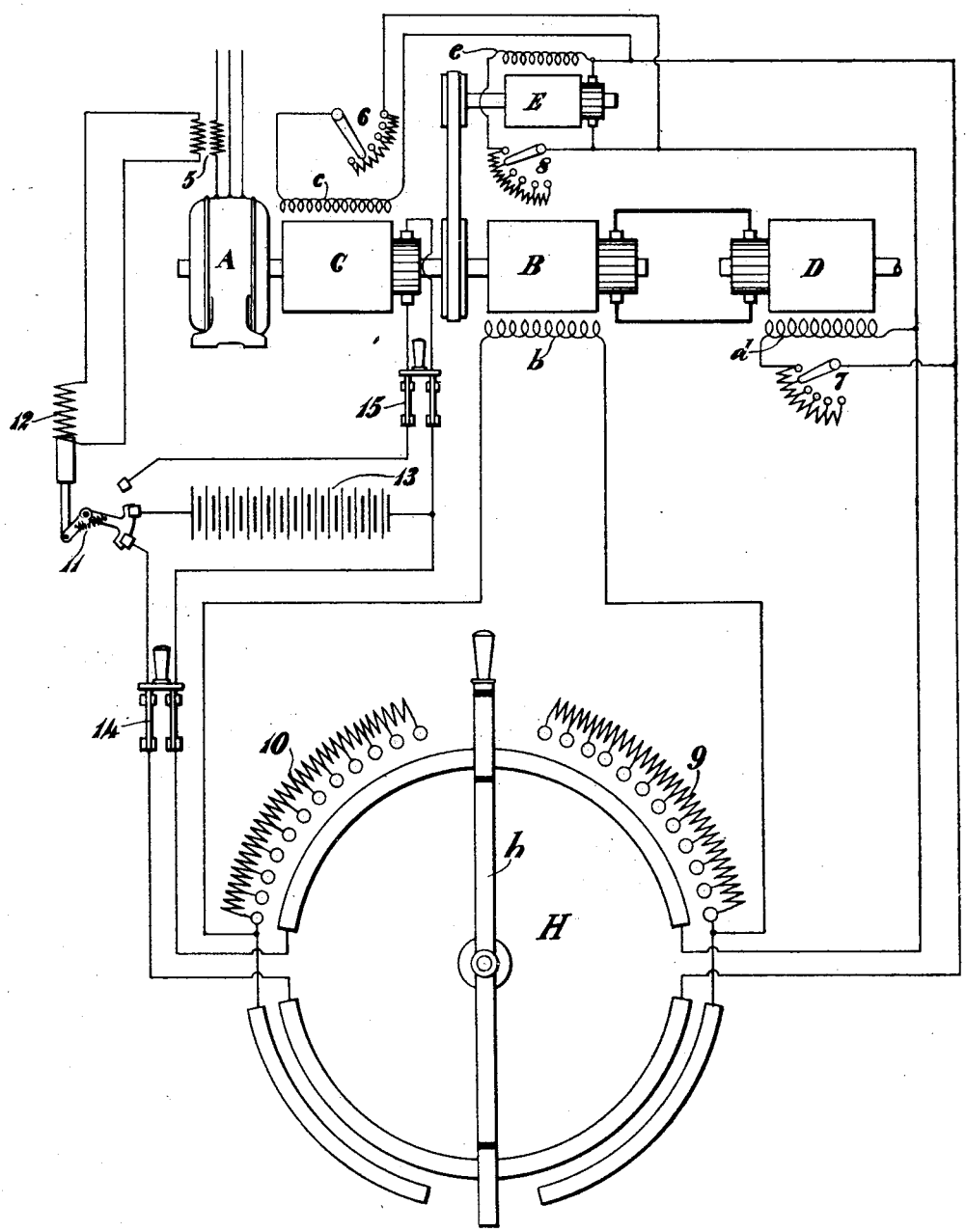
Witnesses
Inventor
Chas. E. Lord

UNITED STATES PATENT OFFICE.

CHARLES E. LORD, OF NORWOOD, OHIO, ASSIGNOR TO ALLIS-CHALMERS COMPANY, A CORPORATION OF NEW JERSEY.

MOTOR-CONTROL SYSTEM.

945,103.  Specification of Letters Patent.  Patented Jan. 4, 1910.

Application filed March 30, 1907. Serial No. 365,442.

*To all whom it may concern:*

Be it known that I, CHARLES E. LORD, citizen of the United States, residing at Norwood, in the county of Hamilton and State of Ohio, have invented certain new and useful Improvements in Motor-Control Systems, of which the following is a full, clear, and exact specification.

My invention relates to motor control systems.

In operating rolling mills and hoisting machinery by electric motors, it has been found very efficient to obtain the necessary reversals and speed variations by varying the electromotive force of a special generator supplying the armature of the main motor, this special generator often being driven by an electric motor supplied with current from any desired source.

In order to maintain the load on the motor driving the generator as nearly constant as possible it has been proposed to mechanically connect a flywheel to the special generator and the motor driving it, and to vary the speed of this motor inversely as the load thereon so that the flywheel may give up and absorb energy at the proper times.

It is the object of my present invention to provide a system in which the load on the motor driving the generator is maintained approximately constant without employing a flywheel for this purpose.

With this object in view my invention comprises the combination of a main source of current supply, an auxiliary source of current supply, means for utilizing current from said main source, means mechanically connected to said first mentioned means for utilizing current from said auxiliary source, and mechanism for rendering said auxiliary source effective to supply current to said second mentioned means when the current drawn by said first mentioned means from the main source exceeds a predetermined value.

Other features of my invention will appear from the description and drawing and will be particularly pointed out in the claims.

The single figure of the drawing shows diagrammatically one embodiment of my invention.

In this figure A is shown as a three phase electric motor, though obviously other forms of motors could be used instead. The generator armature B is driven by the motor A, being preferably directly connected thereto. Also mechanically connected to the motor A are two other armatures C and E, which may be either directly connected thereto as is the armature C or belted thereto as is the armature E. The generator B supplies current to the armature D of the working motor. The motor D may be used to drive any desired machinery. The field windings $c$, $d$ and $e$ are preferably all supplied with current from the exciter armature E, and may be adjusted by rheostats 6, 7 and 8 respectively. The field winding $b$ is also supplied from the exciter E, the current in this field winding being variable and reversible in accordance with the extent and direction of the movement of the arm $h$ of the controller H from the vertical. By means of a snap switch 11, operable by a solenoid 12 supplied from the secondary of a series transformer 5, a battery 13 may be connected to supply current to the armature C or to be supplied with current by the armature E, the electromotive forces of the armatures C and E being respectively below and above that of the battery. The switches 14 and 15 when open disconnect the battery 13 from the armatures C and E respectively regardless of the position of the switch 11.

The operation of the system is as follows:—The motor A is started in any desired manner. The armatures B, C and E are also started with the motor A, and the armature E supplies current to the field windings $c$, $d$ and $e$. During this starting the arm $h$ is preferably in its vertical or "off" position, disconnecting the field winding $b$, and the switches 14 and 15 are preferably open so that movements of the switch 11 during starting produce no effect. When the motor A has reached its normal speed, the currents in the field windings $c$, $d$ and $e$ are properly adjusted by the rheostats 6, 7 and 8 respectively. The switches 14 and 15 are closed and, as the switch 11 is down, the exciter E charges the storage battery 13. The arm $h$ is now moved from the vertical toward the horizontal to admit current to the field winding $b$ in the proper direction to give the motor D the desired direction of rotation. As this arm moves, say anti-clockwise, it first connects the field coil $b$ to the armature E through the whole resistance 10 and then gradually cuts said resistance out of circuit. As the resistance 10 is cut out of circuit by the movement of the arm $h$ toward the horizontal, the voltage impressed on the motor armature D by the generator armature B is increased because of the increased effect of the field winding $b$. The speed which the motor D acquires depends upon the extent of movement of the arm $h$, the full speed being reached when the resistance 10 has been entirely cut out. If the load is heavy the working motor requires more power than the motor A can furnish. The increased current in the transformer 5 now excites the solenoid 12 more strongly so that it throws the switch 11 to connect the battery 13 to the armature C and disconnect it from the armature E. The armature C now runs as a motor armature to help the motor A drive the generator B to supply electrical energy at the rate demanded by the motor D to drive its load. When the load becomes lighter the solenoid 12 becomes weaker and allows the switch 11 to drop to its lower position to disconnect the battery from the armature C and connect it to the armature E to be charged. As the arm $h$ is moved backward toward the vertical, the field $b$ is weakened and the electromotive force impressed on the armature D by the armature B diminished. This permits the motor D to slow down, this slowing down being assisted because the armature D now acts as a generator armature to supply current to the armature B which acts as a motor armature to drive the machines A, C and E. The diminished current in the primary of the transformer 5 allows the switch 11 to drop to its lower position, if it has not already done so, to disconnect the battery 13 from the armature C and connect it to the armature E. With this connection the battery is charged by the exciter and throws an additional load on the armature B, now running as a motor armature, thus producing a more powerful braking action on the motor D, running as a generator. When the arm $h$ is moved in the other direction from the vertical the above cycle is repeated save that the motor D is caused to rotate in the other direction because the direction of current in its armature is reversed on account of the reversal of the field of the generator B, and the resistance 9 is used instead of the resistance 10.

I have described my invention in what I now consider to be its preferred form, but many modifications may be made in the precise arrangements shown and described and all such which do not involve a departure from the spirit and scope of my invention I aim to cover in the following claims.

What I claim as new is:—

1. In combination, a motor, a plurality of dynamo-electric machines mechanically connected to said motor, a storage battery, and automatic means for electrically connecting said battery to one of said dynamo-electric machines when the load on the motor is below a predetermined value and to another of said dynamo-electric machines when the load on the motor is above a predetermined value.

2. In combination, a generator, driving means therefor, a plurality of dynamo-electric machines mechanically connected to said generator, a storage battery, and automatic means for electrically connecting said battery to one of said dynamo-electric machines when the load on said generator is below a predetermined value and to another of said dynamo-electric machines when the load on the generator is above a predetermined value.

3. In combination, a main motor, a generator supplying said motor, means for driving said generator, a plurality of dynamo-electric machines mechanically connected to said generator, a storage battery, and automatic means for electrically connecting said battery to one of said dynamo-electric machines when the load on said main motor is below normal and to another of said dynamo-electric machines when the load on the main motor is above normal.

4. In a system of motor control, a main motor, a generator supplying the armature of said motor, means for varying and reversing the electromotive force of said generator, means for driving said generator, an auxiliary motor mechanically connected to said generator, and means for supplying current to said auxiliary motor when the load on the main motor exceeds a predetermined value.

5. In a system of motor control, a main motor, a generator supplying the armature of said motor, means for varying and reversing the electromotive force of said generator, means for driving said generator, a dynamo-electric machine mechanically connected to said generator, a storage battery, and means for electrically connecting said dynamo-electric machine and said storage battery when the load on the main motor departs from a predetermined value.

6. In a system of motor control, a main motor, a generator supplying the armature of said motor, means for varying and reversing the electromotive force of said generator, means for driving said generator, a second generator mechanically connected to the first, a storage battery, and means whereby said second generator supplies current to said storage battery whenever the load on the main motor falls below normal.

7. In a system of motor control, a main motor, a generator supplying the armature of said motor, means for varying and reversing the electromotive force of said generator, means for driving said generator, a plurality of dynamo-electric machines mechanically connected to said generator, a storage battery, and automatic means for electrically connecting said battery to one of said dynamo-electric machines when the load on said main motor is light and to another of said dynamo-electric machines when the load on the main motor is heavy.

8. In a system of motor control, a main motor, a generator supplying the armature of said motor, means for varying and reversing the electromotive force of said generator, means for driving said generator, a storage battery, and means mechanically connected to said generator and arranged to supply current to the battery when the load on the main motor is below normal and to be supplied with current from said battery when the load on the main motor is above normal.

9. In a system of motor control, a main motor, a generator supplying the armature of said motor, means for varying and reversing the electromotive force of said generator, means for driving said generator, a storage battery, and means mechanically connected to said generator and arranged to supply current to or be supplied with current from said storage battery according as the load on the main motor is below or above normal.

10. In combination, a motor driving a variable load, two dynamo-electric machines also driven by said motor, and having different electromotive forces, a storage battery the electromotive force of which is between that of said two dynamo-electric machines, and automatic means for connecting said battery to the dynamo-electric machine having the higher or the lower electromotive force according as the load on the motor is below or above the normal.

11. In combination, a main source of current supply, an auxiliary source of current supply, means for utilizing current from said main source, means mechanically connected to said first mentioned means for utilizing current from said auxiliary source, mechanism for rendering said auxiliary source effective to supply current to said second mentioned means when the current drawn by said first mentioned means from the main source exceeds a predetermined value, and a generator mechanically connected to and driven by said means.

12. In combination, a main source of current supply, an auxiliary source of current supply, means for utilizing current from said main source, means mechanically connected to said first mentioned means for utilizing current from said auxiliary source, mechanism for rendering said auxiliary source effective to supply current to said second mentioned means when the current drawn by said first mentioned means from the main source exceeds a predetermined value, a generator mechanically connected to and driven by said means, a motor supplied with current from said generator, and means for varying the speed of said motor by varying the electromotive force of said generator.

13. In combination, a source of alternating current supply, a source of direct current supply, means for utilizing current from both of said sources, mechanism for rendering said direct current source effective to supply current to said means when the current drawn by said means from the alternating current source exceeds a predetermined value, and a generator mechanically connected to and driven by said means.

14. In combination, a source of alternating current supply, a source of direct current supply, means for utilizing current from both of said sources, mechanism for rendering said direct current source effective to supply current to said means when the current drawn by said means from the alternating current source exceeds a pretermined value, a generator mechanically connected to and driven by said means, a motor supplied with current from said generator, and means for varying the speed of said motor by varying the electromotive force of said generator.

In testimony whereof I affix my signature, in the presence of two witnesses.

CHARLES E. LORD.

Witnesses:
  Geo. B. Schley,
  Fred J. Kinsey.